J. H. Rhodes.
Pipe Coupling.
№ 68,388. Patented Sept. 3, 1867.
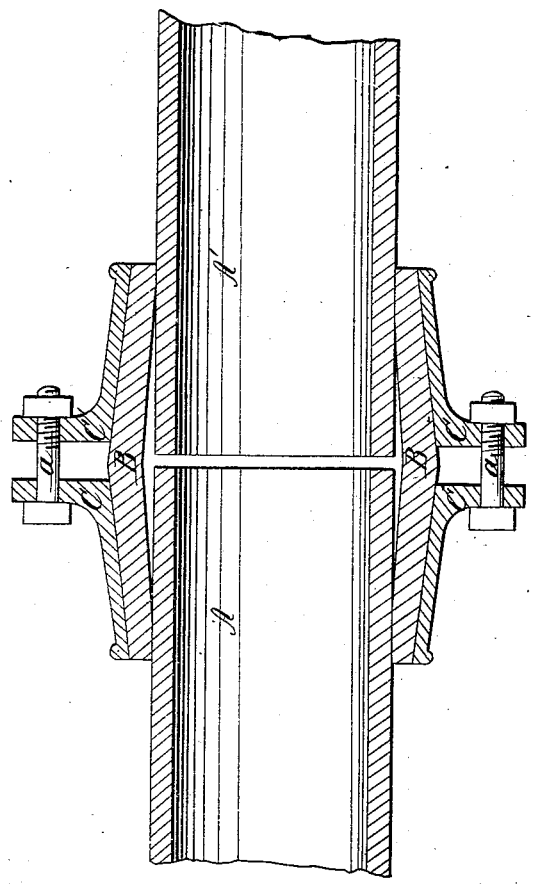
Witnesses
Lawrence Holmes
G. W. Reed
Inventor
John H. Rhodes

United States Patent Office.

JOHN H. RHODES, OF BROOKLYN, NEW YORK.

Letters Patent No. 68,388, dated September 3, 1867.

---

IMPROVEMENT IN PIPE-JOINTS.

---

The Schedule referred to in these Letters Patent and making part of the same.

---

TO ALL WHOM IT MAY CONCERN:

Be it known that I, JOHN H. RHODES, of Brooklyn, in the county of Kings, and State of New York, have invented a new and useful Improvement in Slip-Sleeve Pipe-Joints, of which the following is a full, clear, and exact description, reference being had to the accompanying drawing, forming part of this specification, and which represents a longitudinal section of two lengths of a pipe, in part with my improved joint establishing the connection between them.

In connecting pipe for the passage or conveyance of water and other fluids, gases, or vapor, especially where the connections are numerous by a division of the pipe into a series of lengths, it is not only important that a tight joint should be secured, but also that every facility should be afforded for establishing the connection with dispatch, and, where necessary, disconnecting the sections of which the pipe is composed. Particularly is this the case in submerged arrangements, as in the laying of pipes for the conveyance of pure or fresh water along or over and across the beds of rivers, creeks, and so forth, to which application or use I especially design this invention, though it of course is applicable to other purposes. Here it is necessary to make the connection by means of a cold joint; and the nature of my invention consists in the combination of a slip-sleeve, of lead or other suitable and impressible material, made of tapering or arched configuration in direction of its length, in combination with a compressing-jacket or outside shells of stiffer material arranged, on being tightened up, to exert a straightening or compressing tendency on the sleeve, which is slipped over the two ends of the pipe to be joined, and so to make tight, or comparatively so, the connection.

Referring to the accompanying drawing, A A' represent two lengths or sections, in part, of an iron water pipe, to establish the joint, at the ends of which I slip over said ends a lead or other suitable compressible sleeve, B, made for a portion of its length of arched or tapering configuration, internally and externally, and preferably thicker at the middle than the ends, which latter should form a close but free fit round the exterior of the pipe sections A A', while the intermediate portion is of large and tapering bore, substantially as represented in the drawing. On the outside of this sleeve B are slipped two conical or other suitably constructed shells or clamping-rings C C', made stouter or of stiffer material or metal than the slip-sleeve, and capable of being drawn towards each other, say by screw-bolts and nuts *a*, the same constituting, in their united form, what may be termed a compressing-jacket.

From this description it will be clear that, on tightening up the clamping-rings C C', the metal or material of which the slip-sleeve is composed, is gradually compressed at its arched or tapered formation, and a tight fit of it at its ends secured on or round the pipe sections A A', the rings C C' acting as wedges upon the lead or compressible sleeve B, and also as braces or supports to such sleeve to prevent bursting of the latter from internal pressure of the fluid, the portion of such sleeve between the inner ends of the clamping-ring, especially if made thicker as represented, being practically free from all liability to rupture. After the joint has been thus established the ends of the sleeve may, if necessary, be caulked by means of a cold chisel. To break the connection, when it is desired to remove a pipe section or sections, it is only necessary to slacken the screw-bolts *a*, when, by the tap of a hammer, the ring or rings C C' may be slid back, and the sleeve B removed. This forms a simple, tight, and expeditious mode of connecting pipes, and ready way of detaching them at pleasure.

What I claim as my invention, and desire to secure by Letters Patent, is—

The combination of the slip-sleeve B, made of an arched or bulging form between its ends, and of soft metal or other suitable compressible material, with a compressing-jacket or clamping-rings C C' of a harder or less pliable character, for operation in connection with the ends of separate lengths or sections of pipe A A', substantially as specified.

JOHN H. RHODES.

Witnesses:
J. W. COOMBS,
G. W. REED.